(12) United States Patent
Coates et al.

(10) Patent No.: US 9,547,104 B2
(45) Date of Patent: Jan. 17, 2017

(54) DOWNHOLE SENSOR INTERROGATION EMPLOYING COAXIAL CABLE

(75) Inventors: Don M. Coates, Santa Fe, NM (US); M. Clark Thompson, Los Alamos, NM (US); David W. Beck, Santa Fe, NM (US); Manuel E. Gonzalez, Kingwood, TX (US); Michael A. Kendrick, Shreveport, LA (US); Daniel L. Neagley, Albuquerque, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 2141 days.

(21) Appl. No.: 12/204,298

(22) Filed: Sep. 4, 2008

(65) Prior Publication Data
US 2009/0174409 A1 Jul. 9, 2009

Related U.S. Application Data

(63) Continuation-in-part of application No. 11/962,695, filed on Dec. 21, 2007, now Pat. No. 7,636,052.

(60) Provisional application No. 60/967,338, filed on Sep. 4, 2007.

(51) Int. Cl.
*G01V 3/00* (2006.01)
*G01V 11/00* (2006.01)
*E21B 47/12* (2012.01)

(52) U.S. Cl.
CPC ............. *G01V 11/00* (2013.01); *E21B 47/122* (2013.01)

(58) Field of Classification Search
CPC ................................................ G01V 3/08–3/28
USPC ...... 175/50; 342/22; 181/101; 324/328, 329, 324/335, 336, 337, 338, 347, 372, 332, 333, 324/334, 339
See application file for complete search history.

(56) References Cited

U.S. PATENT DOCUMENTS

| | | | |
|---|---|---|---|
| 3,320,579 A | 5/1967 | Abbott | |
| 3,562,741 A | 2/1971 | McEvoy et al. | |
| 4,023,136 A | 5/1977 | Lamensdorf et al. | ... 340/18 NC |
| 4,160,970 A | 7/1979 | Nicolson | .................. 340/18 LD |
| 4,218,507 A | 8/1980 | Deffeyes et al. | ............. 428/328 |
| 4,281,289 A * | 7/1981 | Donaldson et al. | .......... 324/355 |
| 4,308,499 A | 12/1981 | Thierbach et al. | ........... 324/337 |
| 4,415,895 A * | 11/1983 | Flagg | ......................... 340/855.6 |
| 4,430,577 A | 2/1984 | Bouquet | ....................... 307/108 |
| 4,839,644 A | 6/1989 | Safinya et al. | ................ 340/854 |
| 4,845,378 A | 7/1989 | Garbe et al. | .................. 307/106 |

(Continued)

FOREIGN PATENT DOCUMENTS

DE 10245425 A1 4/2003
EP 0314654 5/1989
(Continued)

OTHER PUBLICATIONS

"Los Alamos/Chevron Strategic Alliance for Advanced Energy Solutions", Los Alamos National Laboratory NewsLetter, vol. 7, No. 19, Sep. 11, 2006, p. 5.*

(Continued)

*Primary Examiner* — Patrick Assouad
*Assistant Examiner* — Demetrius Pretlow
(74) *Attorney, Agent, or Firm* — Pillsbury Winthrop Shaw Pittman, LLP

(57) ABSTRACT

The present invention is directed to methods and systems for oil field downhole sensing and communication during drilling and/or production, wherein such methods and systems utilize coaxial cable to transmit electromagnetic (EM) energy, continuously or as a pulse, to passive downhole sensors.

19 Claims, 3 Drawing Sheets

(56) References Cited

U.S. PATENT DOCUMENTS

| | | | |
|---|---|---|---|
| 4,849,699 A * | 7/1989 | Gill et al. | 324/339 |
| 5,066,916 A * | 11/1991 | Rau | 324/338 |
| 5,150,067 A | 9/1992 | McMillan | 328/64 |
| 5,302,879 A | 4/1994 | Totty et al. | |
| 5,355,714 A | 10/1994 | Suzuki et al. | 73/146.5 |
| 5,423,222 A | 6/1995 | Rudd et al. | 73/779 |
| 5,451,873 A | 9/1995 | Freedman et al. | 324/303 |
| 5,467,083 A | 11/1995 | McDonald et al. | 340/854.6 |
| 5,546,810 A | 8/1996 | Arikawa et al. | |
| 5,576,703 A | 11/1996 | MacLeod et al. | 340/854.4 |
| 5,587,707 A | 12/1996 | Dickie et al. | 340/870.09 |
| 5,680,029 A | 10/1997 | Smits et al. | 320/2 |
| 5,686,779 A | 11/1997 | Vig | 310/366 |
| 5,751,895 A | 5/1998 | Bridges | |
| H1744 H | 8/1998 | Clayton et al. | 374/117 |
| 5,821,129 A | 10/1998 | Grimes et al. | 436/151 |
| 5,917,160 A | 6/1999 | Bailey | |
| 5,936,913 A | 8/1999 | Gill et al. | 367/25 |
| 5,942,991 A * | 8/1999 | Gaudreau et al. | 340/870.16 |
| 6,025,725 A | 2/2000 | Gershenfeld et al. | 324/652 |
| 6,209,640 B1 * | 4/2001 | Reimers et al. | 166/254.1 |
| 6,234,257 B1 | 5/2001 | Ciglenec et al. | 175/50 |
| 6,393,921 B1 | 5/2002 | Grimes et al. | 73/728 |
| 6,434,372 B1 | 8/2002 | Neagley et al. | 455/106 |
| 6,489,772 B1 | 12/2002 | Holladay et al. | |
| 6,633,236 B2 | 10/2003 | Vinegar et al. | 340/854.4 |
| 6,670,880 B1 | 12/2003 | Hall et al. | 336/132 |
| 6,766,141 B1 | 7/2004 | Briles et al. | 455/40 |
| 6,993,432 B2 | 1/2006 | Jenkins et al. | 702/13 |
| 7,017,662 B2 | 3/2006 | Schultz et al. | 166/254.2 |
| 7,114,561 B2 | 10/2006 | Vinegar et al. | 166/250.01 |
| 7,158,049 B2 | 1/2007 | Hoefel et al. | 340/855.7 |
| 7,168,487 B2 | 1/2007 | Salamitou et al. | 166/250.11 |
| 7,180,826 B2 | 2/2007 | Kusko et al. | 367/85 |
| 7,256,707 B2 | 8/2007 | Clark et al. | 340/854.4 |
| 7,397,388 B2 | 7/2008 | Huang et al. | 340/853.3 |
| 7,530,737 B2 * | 5/2009 | Thompson et al. | 374/136 |
| 7,548,068 B2 | 6/2009 | Rawle et al. | 324/534 |
| 2002/0157895 A1 * | 10/2002 | Dubinsky et al. | 181/102 |
| 2002/0195247 A1 | 12/2002 | Ciglenec et al. | |
| 2003/0010492 A1 | 1/2003 | Hill et al. | |
| 2003/0053516 A1 | 3/2003 | Atherton | |
| 2003/0102995 A1 * | 6/2003 | Stolarczyk et al. | 342/22 |
| 2005/0110655 A1 | 5/2005 | Layton | |
| 2005/0264293 A1 * | 12/2005 | Gao et al. | 324/326 |
| 2006/0266109 A1 | 11/2006 | DiFoggio | |
| 2007/0030762 A1 | 2/2007 | Huang et al. | 367/83 |
| 2007/0040557 A1 * | 2/2007 | Johnstad et al. | 324/324 |
| 2007/0107528 A1 | 5/2007 | Schroeder et al. | 73/779 |
| 2007/0206440 A1 | 9/2007 | Fripp et al. | 367/81 |
| 2007/0235184 A1 * | 10/2007 | Thompson et al. | 166/250.01 |
| 2008/0061789 A1 | 3/2008 | Coates et al. | 324/333 |
| 2008/0062036 A1 * | 3/2008 | Funk et al. | 342/22 |
| 2008/0110691 A1 * | 5/2008 | Chang et al. | 181/106 |
| 2008/0184787 A1 | 8/2008 | Coates | 73/152.12 |
| 2008/0185328 A1 | 8/2008 | Stefanini | 210/222 |
| 2008/0187025 A1 * | 8/2008 | Coates | 374/184 |
| 2008/0253230 A1 | 10/2008 | Thompson et al. | 367/129 |
| 2008/0264624 A1 | 10/2008 | Hall et al. | 166/66.5 |
| 2008/0285619 A1 * | 11/2008 | Thompson et al. | 374/136 |
| 2009/0031796 A1 * | 2/2009 | Coates et al. | 73/152.51 |
| 2009/0159361 A1 | 6/2009 | Coates et al. | 181/106 |
| 2009/0174409 A1 | 7/2009 | Coates et al. | |

FOREIGN PATENT DOCUMENTS

| | | |
|---|---|---|
| EP | 1434063 A | 6/2004 |
| GB | 2386691 | 9/2003 |
| GB | 2425593 | 11/2006 |
| WO | 01/73380 A1 | 10/2001 |
| WO | 01/75410 A1 | 10/2001 |
| WO | 02/93126 A2 | 11/2002 |
| WO | 2004003329 A2 | 1/2004 |

OTHER PUBLICATIONS

Martin Rowe, "Save energy with reflections", Test & Measurement World, Oct. 2003, p. 25.*
"Virtually Unlimited Airtime, Non-Radiating Wireless Communications System (INFICOMM)", Commerce Business Daily, Mar. 7, 2000.*
"Virtually Unlimited Airtime, Non-Radiating Wireless Communications System (INFICOMM)", U.S. Government Procurements, Mar. 3, 2000.*
"Innovation: Technology Transfer 2005-2006 Progress Report", Los Alamos National Laboratory, p. 11.*
Marjorie Mascheroni, "Los Alamos, Chevron to Revolutionize Oil and Gas Exploration", FLC NewsLink, Jan. 2006, p. 1 and 4.*
Goswami et al., On Subsurface Wireless Data Acquisition System, IEEE Transactions on Geoscience and Remote Sensing, vol. 43, No. 10, Oct. 2005.
International Search Report and Written Opinion for PCT International Patent Application No. PCT/US2008/075214, mailed on Oct. 10, 2009.
International Search Report and Written Opinion for PCT International Patent Application No. PCT/US2010/057414, mailed on Feb. 22, 2011.
International Search Report and Written Opinion for PCT International Patent Application No. PCT/US2007/077866, mailed on Mar. 30, 2009.

* cited by examiner

DOWNHOLE SENSOR INTERROGATION EMPLOYING COAXIAL CABLE

This application is a Continuation In Part of U.S. patent application Ser. No. 11/962,695 filed Dec. 21, 2007. This application claims priority to U.S. Provisional Application 60/967,338, filed Sep. 4, 2007. The entire contents of all applications are incorporated herein by reference in their entireties.

FIELD OF THE INVENTION

This invention relates generally to downhole sensing, and more particularly to methods and systems for oil field downhole sensing and communication during drilling and/or production.

BACKGROUND

INFICOMM is a wireless, downhole technique for interrogating downhole sensors, comprising resonant circuits (e.g., tank circuits), by sending electromagnetic (EM) energy, as a signal, down a borehole, letting it interact with the downhole sensor so as to modulate the signal in a manner that is correlatable to downhole environmental conditions (e.g., temperature and/or pressure), then transmitting the modulated signal back to the surface for processing. In general, INFICOMM sensors consist of passive components and contain no internal power source.

In the wireless INFICOMM reflective signal approach, the wellbore itself acts like a coaxial cable with an insulating fluid in the annulus separating the tubing and casing. The inventors have determined that the requirement that said fluid be insulating, however, may be somewhat restrictive for particular applications.

Accordingly, the inventors have determined that it would be beneficial to enable a more universal utilization of the INFICOMM sensors, with application to borehole environments that do not include insulating fluid therein.

SUMMARY

Aspects of embodiments of the invention include a system for interrogating a downhole environment in a casing-lined borehole beneath a surface, said system including a source of electromagnetic energy positionable at the surface and operable for generation of an electromagnetic energy signal, a sensor module, the sensor module including a passive resonating circuit that, during use, modulates the electromagnetic energy signal in response to an environmental condition in the downhole environment, and a coaxial transmission cable, electrically insulated from the casing of the borehole, and in electrical communication with the source and the sensor module.

Aspects of embodiments of the invention include a method of interrogating a downhole environment in a casing-lined borehole beneath a surface, the method including transmitting an electromagnetic energy signal via a coaxial transmission cable electrically insulated from the casing of the borehole, and in electrical communication with the source and a sensor module having a passive resonating circuit that, during use, modulates the electromagnetic energy signal in response to an environmental condition in the downhole environment. Embodiments of the invention may further include receiving the modulated electromagnetic energy signal and/or processing the received signal to determine information regarding the environmental condition.

In an embodiment, the borehole is an open hole, that is, there is no casing lining the borehole.

Aspects of embodiments of the invention may include a system configured and arranged to provide control of the device in accordance with the foregoing method. Such a system may incorporate, for example, a computer programmed to allow a user to control the device in accordance with the method, or other methods.

Aspects of embodiments of the invention may include a machine-readable medium encoded with machine-executable instructions for performing the method or for controlling the system.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DESCRIPTION OF THE DRAWING

For a more complete under standing of the present invention, and the advantages thereof, reference is now made to the following description taken in conjunction with the accompanying drawing, in which.

DESCRIPTION OF THE INVENTION

This invention is directed to methods and systems for oil field downhole sensing and communication during drilling and/or production, wherein such methods and systems utilize coaxial cable to transmit electromagnetic (EM) energy, continuously or as a pulse, to downhole INFICOMM sensors.

Figure 1:
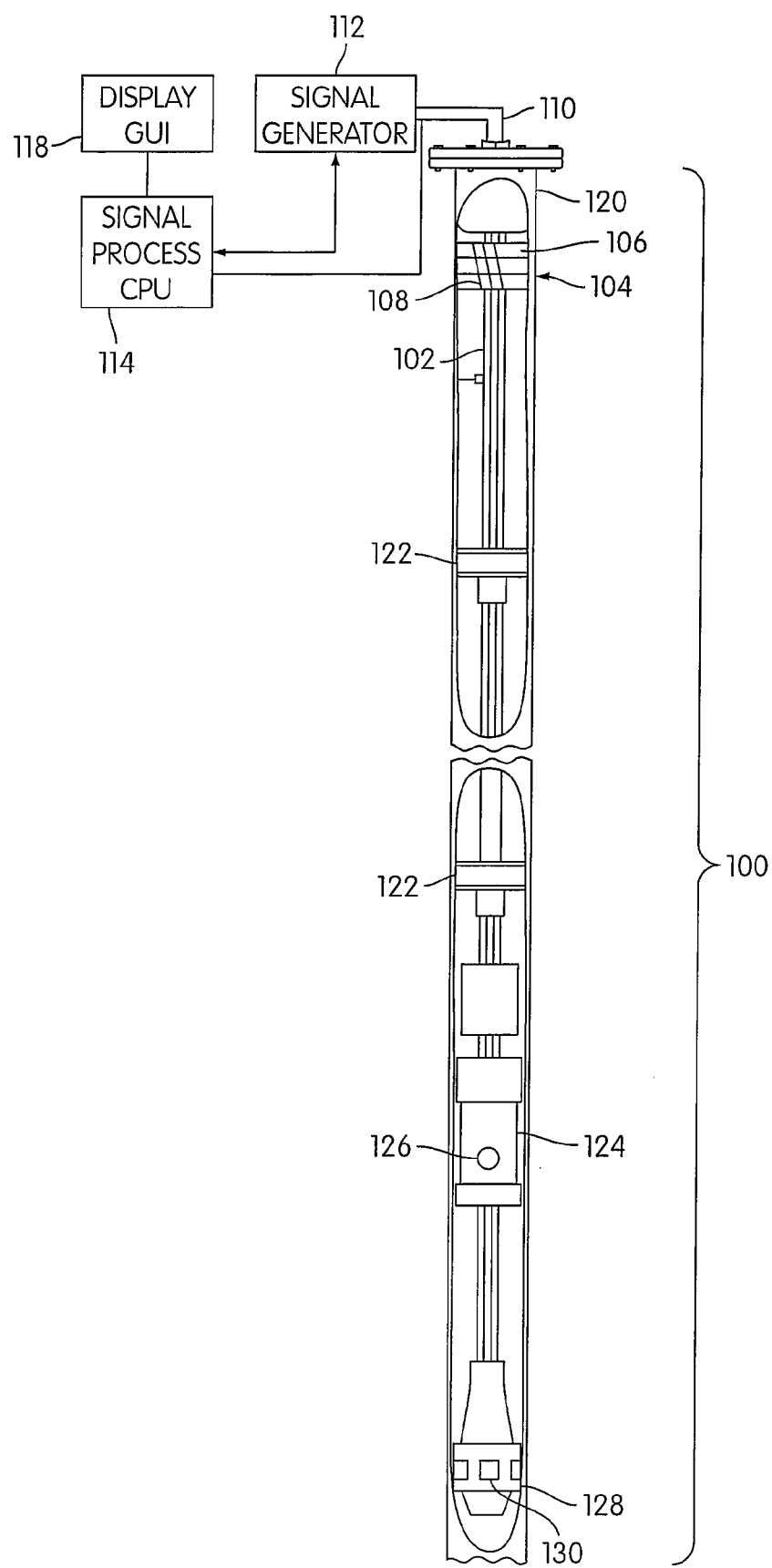
FIG. 1 shows an embodiment of an apparatus for monitoring environmental conditions in a borehole.

FIG. 1 illustrates an example of an apparatus 100 for monitoring conditions in a subsurface borehole. As will be appreciated, the device may find application in monitoring of pressure and/or temperature, for example. Furthermore, appropriately designed pressure sensors, such as those described in U.S. patent application Ser. No. 11/962,695, for example, may provide for acoustic monitoring. The apparatus 100 includes an electromagnetically transmissive medium, such as a conductive line 102, for conducting electromagnetic energy through the borehole. In accordance with embodiments of the present invention, the conductive line comprises a coaxial, or other cable. The conductive line 102 may be, for example, enclosed by or adjacent a production tubing string in a completed borehole or a drillstring in a borehole under construction. Near the top of the conductive line 102, a transformer 104 is provided to couple the conductive line to a source of electromagnetic energy. Alternate coupling methods to the transformer 104 may be employed. For example, the transmission line may directly couple to a coaxial cable or any other suitable cable.

In the example embodiment as shown, the transformer 104 includes a stack of ferrite rings 106, and a wire 108 wound around the rings. The wire 108 includes leads 110 that may be coupled to a signal generator 112 which may be configured to produce a pulsed or a continuous wave signal, as necessary or desirable. The wire 108 may further be coupled to a receiver 114. The receiver 114 may be embodied as a computer that includes a bus for receiving signals from the apparatus 100 for storage, processing and/or display. In this regard, the computer 114 may be provided with a display 118 which may include, for example, a graphical user interface.

The computer 114 may be programmed to process the modulated frequency to provide a measure of the sensed characteristic. The computer 114 may perform any desired processing of the detected signal including, but not limited to, a statistical (e.g., Fourier) analysis of the modulated vibration frequency, a deconvolution of the signal, a correlation with another signal or the like. Likewise, time domain or frequency domain tracking can be used to ensure good signal acquisition. Commercial products are readily available and known to those skilled in the art can be to perform any suitable frequency detection. Alternately, the computer may be provided with a look-up table in memory, or in accessible storage, that correlates received modulated frequencies to sensed acoustic energy.

In a typical drilling application, the borehole will be lined with a borehole casing 120 which is used to provide structural support to the borehole. This casing 120 is frequently made from a conductive material such as steel. Likewise, a fluid medium present in the casing may be a conductive medium (not shown), such as salt water or drilling mud having conductive properties. Thus, the conductive line 102 should be insulated from the conductive casing 120 and from the conductive medium. As will be appreciated, the use of a coaxial cable having an outer insulating layer may achieve this goal.

In order to maintain a spacing between the line 102 and the casing 120, the apparatus 100 may include spacers 122 disposed periodically along the conductive line 102. The spacers can, for example, be configured as insulated centralizers which can be disks formed from any suitable material including, but not limited to, nylon or polytetrafluoroethylene (PTFE).

A probe portion 124 is located near the distal end of the apparatus 100. In principle, the probe portion may be located at any point along the length of the transmission line. Indeed, multiple such probe portions may be placed at intervals along the length, though this would tend to create additional signal processing burdens in order to differentiate signals from the several probes. Setting a natural resonance frequency of each probe at a different frequency would, in principle, allow for a type of wavelength multiplexing on the coaxial line that could simplify the processing.

The probe portion may include a port 126 that is configured to communicate with the ambient environment of the borehole into the probe where it may be sensed by the sensor (not shown in FIG. 1). Below the probe is illustrated a packer 128 and packer teeth 130.

In use, the signal generator 112 generates an electromagnetic signal that is transmitted through the transmission line to the probe 124. In an alternate embodiment, consistent with the present invention, the signal may be generated locally as described in U.S. patent application Ser. No. 11/898,066, herein incorporated by reference.

The probe includes a sensor that includes a resonant circuit portion that, upon receiving the pulse, modulates and re-emits or reflects the pulse back up the transmission line. The resonant circuit may be, for example, a tank circuit that includes inductive and capacitive components. In a tank circuit arrangement, either the inductive or the capacitive component may be configured to be sensitive to acoustic energy such that as acoustic energy impinges on the component, the resonant frequency of the tank circuit changes, thereby modulating the returned electromagnetic signal in accordance with the received energy.

Figure 2:
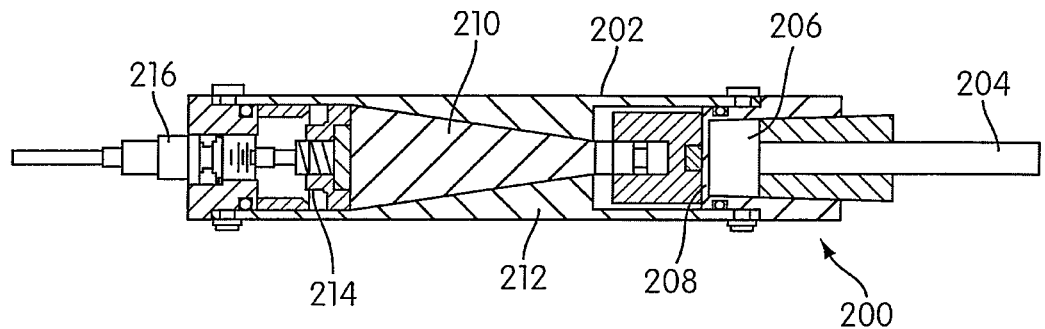
FIG. 2 shows an embodiment of a variable capacitor for use in an embodiment of the apparatus illustrated in FIG. 1.

A number of alternate arrangements for the sensor elements are possible. In an embodiment, the sensor module is based on a capacitive sensing element 200 as illustrated in FIG. 2. A housing 202 has at one end a pressure feed-in tube 204 that allows acoustic energy from the borehole environment, for example via the port 126, to pass to an interior space 206 of the housing, such that it impinges on a flexible membrane 208.

Motions of the flexible membrane 208 are transmitted to a male conical portion 210 that engages a female conical portion 212 to form a variable capacitor. As shown in FIG. 2, the female conical portion 212 may simply comprise a cavity in the housing 202. Alternately, the female conical portion may be a separate structure held within the housing. One or both of the conical portions 210, 212 may include a layer of dielectric material to ensure that even when the portions are in mutual contact, they have some degree of capacitance rather than acting as a short.

The male cone 210 is spring biased towards the female cone by a spring mechanism 214, resulting in a minimum capacitance in the absence of any deflection of the membrane 208. As acoustic energy vibrates the flexible membrane 208, the male cone 210 moves relative to the female cone 212, changing a distance therebetween and altering a capacitance of the device.

A spring constant of the spring mechanism, a flexibility of the flexible membrane and a mass of the male cone cooperate to define a physical element of a frequency response of the sensor. As will be appreciated, to monitor high frequency vibrations, the inertial mass of the moveable parts should be minimized, the spring should be relatively soft and the membrane should be highly flexible. For lower frequency monitoring, these factors become less important, and sensitivity may be sacrificed in favor of more durable construction.

An electrical lead 216 is included for connecting the sensor 200 to other electrical components of the probe, not shown in this view, but illustrated in FIG. 4 and described in greater detail below.

As will be appreciated, alternate approaches can be taken. For example, in an embodiment, the sensor may include a capacitor configured as a capacitive pressure sensor, in which distance between plates of the capacitor is reduced as pressure is increased, and vice versa. Likewise, inductive displacement sensors may be used, where inductance changes with motion of a permeable core in accordance with changes in pressure in a volume, or strains in a structure.

Figure 3:
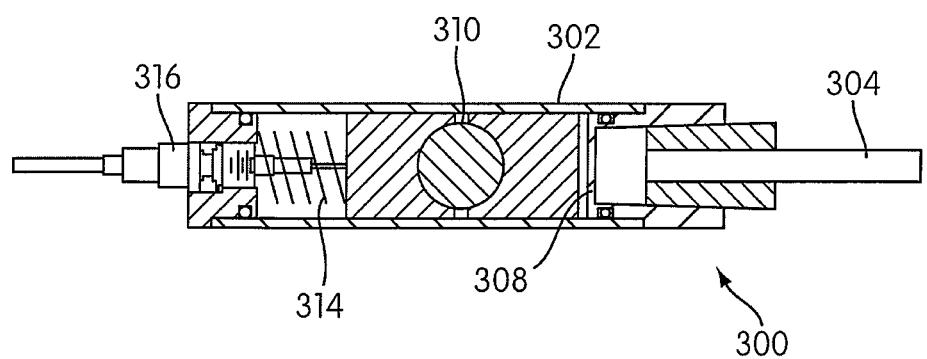
FIG. 3 shows an embodiment of a crystal oscillator for use in an embodiment of the apparatus illustrated in FIG. 1.

An embodiment makes use of a crystal-based oscillator 300 as illustrated in FIG. 3. The structure of the housing 302 may be similar to that of the housing 202. For example, the feed-in tube 304 may be similar to the feed-in tube 204 illustrated in FIG. 2. The feed-in tube 304 allows acoustic energy to pass into an interior space 206 of the sensor 300, where it is allowed to impinge on a flexible diaphragm 308.

Motion of the diaphragm 308 is transmitted to a quartz crystal 310. As pressure is transmitted to an edge of the quartz crystal, its resonant frequency changes. By correct selection of a direction of cut of the crystal, the sensor may be made to be more sensitive to pressure or to temperature. For acoustic monitoring, the crystal should be preferentially sensitive to pressure and relatively less sensitive to temperature. Furthermore, for acoustic monitoring, it is useful for the crystal to be generally relatively thin (e.g., 0.2-2.0 mm) and a typical size is on the order of 1 cm in diameter.

A return spring mechanism 314 is provided to bias the crystal 310 and its holders towards the feed-in tube 304 and thereby to tend to cause the diaphragm to return to a neutral position. As with the capacitive sensor, an electrical feed through 316 is provided to couple the sensor 300 to the sensor circuit (not shown).

In place of either a variable capacitor or a variable oscillator, a variable inductor (not illustrated) may be used as the sensor component. In such an arrangement, a voice coil or other type of variable inductor may be used to change a resonant frequency of the sensor circuit in response to the received acoustic energy. By way of example, such a variable inductor can include a toroidal ferrite core. For ferrite-based inductors having a temperature dependent inductance, the variation in inductance will provide temperature information about the downhole environment. Where multiple sensors are used, each may include a ferrite core having a different formulation of ferrite, which can result in varying sensitivities to temperature across the sensors. A look-up table can be used to calibrate the inductance drift to specific values or ranges of temperature, as desired.

It should be noted that for any of the embodiments, the sensor pressure feed-in tube may be configured such that it acts as an acoustic filter. In this regard, it may include an opening that acts as a high pass filter and/or an expansion chamber that acts as a low pass filter. For pressure sensing applications, it may be useful to make use of low pass filtering to remove acoustic components; however, as noted above, appropriate design of the response frequency of the sensor can achieve the same result. By placing multiple such structures in series along the feed-in tube, a band pass filter may be implemented. Rather than filtering in the acoustic domain, filtering may be performed on the electronic signals, either in circuitry or at the computer as desired.

Figure 4:
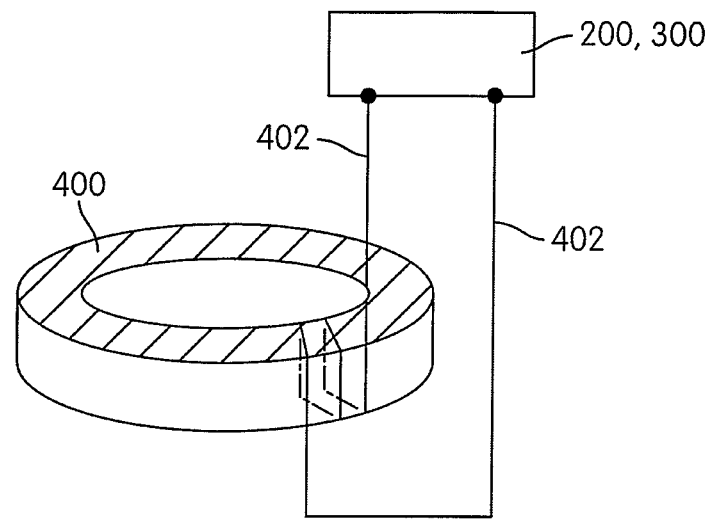
FIG. 4 schematically illustrates a circuit of which the sensors of FIGS. 2 and 3 are elements.

Whichever sensor 200 or 300 is used, it may be coupled to the transmission line via an inductive ferrite ring 400 as illustrated in FIG. 4. Electrical leads 402 are provided through the electrical feed through 216 or 316 of the sensor module. The leads 402 couple wire loops around the ferrite ring 400 and comprise an inductor. When used with a capacitive sensor 200, the inductor comprises a portion of the tank circuit along with the sensor. When used with an oscillator based sensor 300, the oscillator itself has the characteristics of an L-C circuit and the ferrite ring merely acts as a transformer to couple the oscillator to the transmission line. When used with an inductor-based sensor (not illustrated), an additional capacitor should be provided in the circuit so that a complete tank circuit is present. In this arrangement, the ferrite ring may be considered as merely a transformer (as in the oscillator configuration) or may be considered to constitute a portion of the inductance of the L-C circuit.

Figure 5:
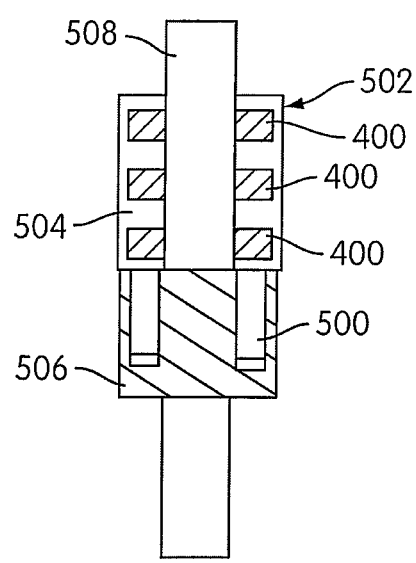
FIG. 5 is a cross-sectional illustration of a housing configured to hold a number of sensors in accordance with embodiments of the present invention

FIG. 5 illustrates a package for sensors in accordance with embodiments of the present invention. A number of sensors 500 are disposed within a common housing 502. For each sensor 500, there is a corresponding ferrite ring 400, which is disposed in a portion 504 of the housing 502 that is made from a dielectric material, for example PTFE. As described above, the rings 400 couple the sensors to the transmission line 102. The sensors, in turn, are held in a metal block portion 506 of the sensor module. Tubing 508 is threaded into the metal block in order to positively locate the sensor package. In a typical application, this tubing may constitute either the production tubing itself, or an extension of the production string.

As will be appreciated, it is possible to combine pressure and temperature sensors in a single package, such that the temperature measurements may be used to help account for temperature related drift of the pressure sensor.

Depending on the particular use of the sensor, it may be useful to filter the signal so as to emphasize a particular frequency spectrum. For example, in acoustic emission monitoring of rock fracture or structural failures, relatively higher frequency acoustic energy may be of interest. On the other hand, for monitoring fluid movement, lower frequency information is likely to be relevant. Furthermore, pressure sensing applications may require an even lower frequency response. In this regard, a number of sensors may be used in a given environment with each optimized for a particular range of frequencies. Likewise, when a number of sensors are used in a single region, information derived from them may be combined to provide directional information about the source of the acoustic energy.

In an off-shore or other water environment, the sending and receiving circuitry can be located on a platform, vessel or other structure above the water surface. In this approach, the wellhead may be in communication with the surface structure via a riser assembly.

Those skilled in the art will appreciate that the disclosed embodiments described herein are by way of example only, and that numerous variations will exist. For example, other arrangements of capacitors, inductors and oscillators may be employed.

As will be appreciated, the sensor packages, whether based on inductors, capacitors and/or crystal oscillators, can be configured to include solely passive electrical components such that no downhole power is needed. Additionally or alternatively, power may be stored in batteries or capacitors for use in powering active components.

All patents and publications referenced herein, and appended hereto, are hereby incorporated by reference to an extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. A system for interrogating a downhole environment in a casing-lined borehole beneath a surface, said system comprising:
   a source of electromagnetic energy positionable at the surface and operable for generation of an electromagnetic energy signal;
   a sensor module, the sensor module comprising a passive resonating circuit that, during use and when positioned in the downhole environment, modulates the electromagnetic energy signal in response to an environmental condition in the downhole environment; and
   a coaxial transmission cable, electrically insulated from the casing of the borehole, and in electrical communication with the source and the sensor module.

2. A system as in claim 1, further comprising:
   a processor, configured and arranged to receive the modulated electromagnetic energy signal from the sensor module via the coaxial transmission cable and to correlate the modulated signal with the environmental condition.

3. A system as in claim 1, wherein the passive resonating circuit comprises an inductor and a resonance frequency of the resonant circuit varies with changes in inductance of the inductor, said changes being due to the environmental condition.

4. A system as in claim 1, wherein the passive resonating circuit comprises a capacitor and a resonance frequency of the resonant circuit varies with changes in capacitance of the capacitor, said changes being due to the environmental condition.

5. A system as in claim 1, wherein the passive resonating circuit comprises a crystal oscillator and a resonance frequency of the resonant circuit varies with changes in a frequency characteristic of the crystal oscillator, said changes being due to the environmental condition.

6. A system as in claim 1, wherein the sensor module further comprises:
   an energy storing circuit element, configured to receive and store energy transmitted through the coaxial transmission cable;
   a pulse generator, configured to receive stored energy from the energy storing circuit element and to discharge the energy to generate a pulse of electromagnetic energy; and
   wherein the passive resonating circuit is configured and arranged to receive energy from the pulse of electromagnetic energy to modulate the electromagnetic energy signal in response to the environmental condition in the downhole environment.

7. A system as in claim 1, wherein;
   the borehole is a subsea borehole; and
   a wellhead of the subsea borehole is in communication with a structure at a surface of the sea via a riser assembly.

8. A system as in claim 1, wherein the source of electromagnetic energy comprises a continuous wave source.

9. A system as in claim 1, wherein the source of electromagnetic energy comprises a pulsed source.

10. A system for interrogating a downhole environment in a casing-lined borehole beneath a surface and having a conductive medium therein, said system comprising:
    a source of electromagnetic energy positionable at the surface and operable for generation of an electromagnetic energy signal;
    a sensor module, the sensor module comprising a passive resonating circuit that, during use and when positioned in the downhole environment, modulates the electromagnetic energy signal in response to an environmental condition in the downhole environment; and
    a transmission cable, electrically insulated from the casing of the borehole and the conductive medium, and in electrical communication with the source and the sensor module.

11. A system as in claim 10, further comprising:
    a processor, configured and arranged to receive the modulated electromagnetic energy signal from the sensor module via the coaxial transmission cable and to correlate the modulated signal with the environmental condition.

12. A system as in claim 10, wherein the passive resonating circuit comprises an inductor and a resonance frequency of the resonant circuit varies with changes in inductance of the inductor, said changes being due to the environmental condition.

13. A system as in claim 10, wherein the passive resonating circuit comprises a capacitor and a resonance frequency of the resonant circuit varies with changes in capacitance of the capacitor, said changes being due to the environmental condition.

14. A system as in claim 10, wherein the passive resonating circuit comprises a crystal oscillator and a resonance frequency of the resonant circuit varies with changes in a frequency characteristic of the crystal oscillator.

15. A system as in claim 10, wherein the sensor module further comprises:
    an energy storing circuit element, configured to receive and store energy transmitted through the coaxial transmission cable;
    a pulse generator, configured to receive stored energy from the energy storing circuit element and to discharge the energy to generate a pulse of electromagnetic energy; and
    wherein the passive resonating circuit is configured and arranged to receive energy from the pulse of electromagnetic energy to modulate the electromagnetic energy signal in response to the environmental condition in the downhole environment.

16. A system as in claim 10, wherein:
    the borehole is a subsea borehole; and
    a wellhead of the subsea borehole is in communication with a structure at a surface of the sea via a riser assembly.

17. A system as in claim 10, wherein the source of electromagnetic energy comprises a continuous wave source.

18. A system as in claim 10, wherein the source of electromagnetic energy comprises a pulsed source.

19. A system for interrogating a downhole environment in a borehole beneath a surface, said system comprising:
    a source of electromagnetic energy positionable at the surface and operable for generation of an electromagnetic energy signal;
    a sensor module, the sensor module comprising a passive resonating circuit that, during use and when positioned in the downhole environment, modulates the electromagnetic energy signal in response to an environmental condition in the downhole environment; and
    a coaxial transmission cable in electrical communication with the source and the sensor module.

* * * * *